May 25, 1965
R. CHUTE
3,185,208
REGENERATOR SLIDING SEALS
Filed Nov. 13, 1961
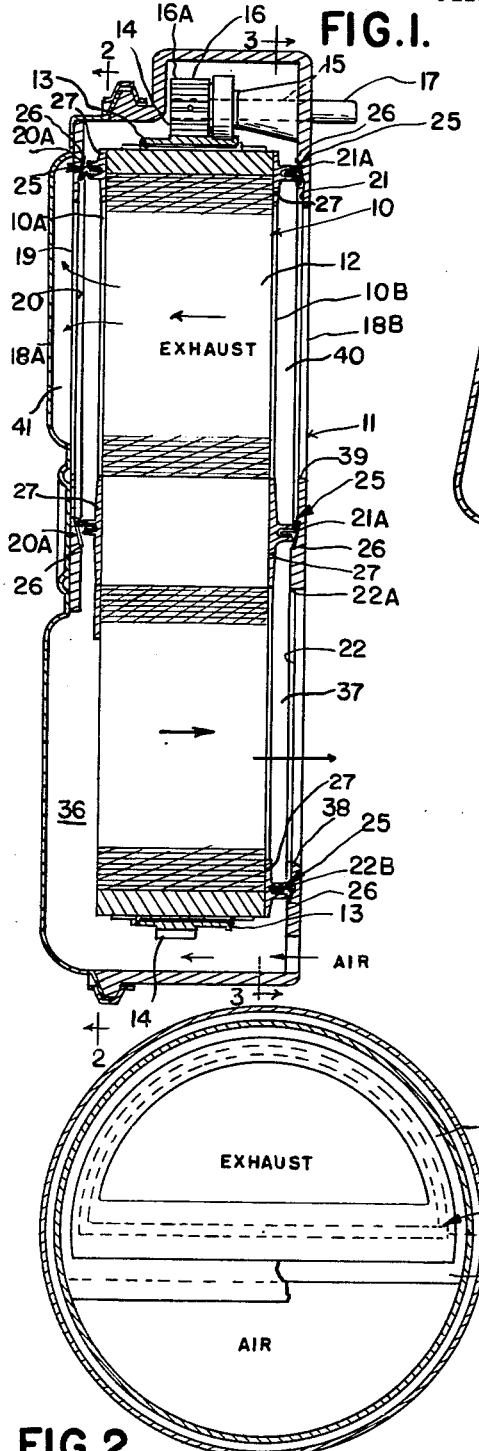
FIG. 1.
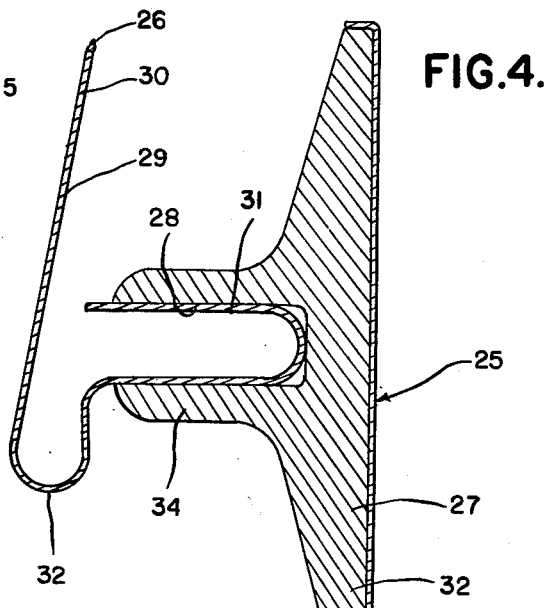
FIG. 4.
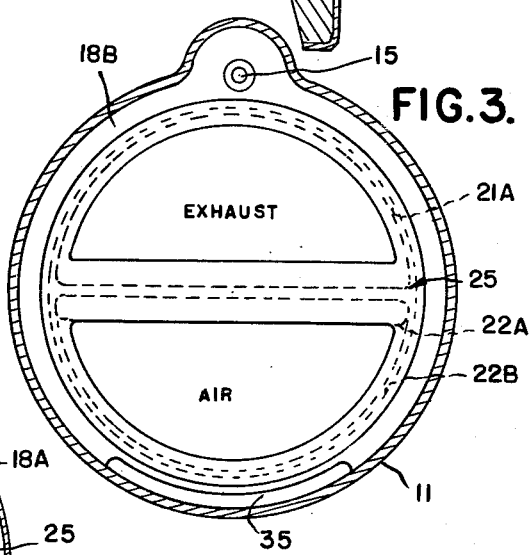
FIG. 3.
FIG. 2.
*INVENTOR.*
RICHARD CHUTE
BY
*ATTORNEYS*

United States Patent Office 3,185,208
Patented May 25, 1965

3,185,208
REGENERATOR SLIDING SEALS
Richard Chute, Huntington Woods, Mich., assignor to Continental Motors Corporation, Muskegon, Mich., a corporation of Virginia
Filed Nov. 13, 1961, Ser. No. 151,945
6 Claims. (Cl. 165—9)

My invention relates to heat exchange apparatus and more particularly to a new sealing means for minimizing leakage losses in a rotary regenerative type heat exchanger.

In a preferred rotary heat exchanger of the type used with a turbine engine, an annular framework carrying a cylindrical matrix of heat absorbent material is rotated in a stationary housing. The housing is provided with duct work and seals which, as far as possible, define two distinct sections. The hot exhaust gases of the engine are directed through one of these sections while compressed air passes through the other on its way to the combustion chamber. The matrix rotates in the paths of flow of these gases, the effect being that the heat of the exhaust gases is substantially reduced by heat transfer to the cooler compressed air. In this way energy which would otherwise be lost is absorbed by the compressed air and retained in the engine.

Efficiency is sacrificed in such an engine if intermixing of the air and exhaust gases is permitted or if either of these gases is allowed to bypass the matrix, such conditions being accompanied by loss of the high energy working medium and by pressure losses. An effective seal must be provided to prevent this direct loss of efficiency. The seal must be constructed to function properly within the intense heats generated by the passage of the exhaust gases. Further, the seal must be able to compensate for warpages and distortions caused by the varying temperatures to which the parts of the apparatus are subjected during operation, and also it must be able to effectively withstand the pressure differential which exists between the substantially spent exhaust gases and the compressed air.

An object of the present invention then is to provide a novel seal for a rotary regenerator which is constructed to compensate for thermal warpage and distortion as well as to withstand the pressure differentials inherent in such apparatus.

Another object of the present invention is to provide a seal of a symmetrical design thereby minimizing thermal effects to the seal itself.

Still another object of the present invention is to provide a seal which is simple in construction, manufacture, assembly and removal.

Other objects of the present invention will readily occur to those skilled in the art upon reference to the accompanying drawings illustrating a preferred embodiment of the invention in which like reference characters refer to like parts throughout the several views and in which FIG. 1 is a lateral cross sectional view of a preferred rotary regenerative heat exchange apparatus embodying the present invention.

FIG. 2 is a cross sectional view of the preferred apparatus taken substantially at line 2—2 of FIG. 1.

FIG. 3 is a cross sectional view of the preferred apparatus taken substantially at line 3—3 of FIG. 1 and FIG. 4 is an enlarged cross-sectional detail portion of the sealing structure.

Referring now to the drawings for a detailed description of the present invention, FIG. 1 shows a preferred apparatus as comprising a substantially cylindrical matrix 10 rotatably carried in a stationary housing 11. The matrix preferably comprises a core structure 12 which may be constructed of any convenient heat transfer material such as ceramic or corrugated or vaned metal sheets. A metal rim structure 13 is secured to the periphery of the core structure 12 and is provided with a peripheral geared portion 14.

The housing 11 rotatably carries a drive shaft 15. A pinion gear 16 is fixed to the end of the drive shaft 15 and is provided with teeth 16A which mesh with the geared portion 14. An extended portion 17 of the drive shaft 15 is adapted to be connected with any convenient source of power. Rotative force applied to the drive shaft 15 acts to rotate the matrix 10 through the pinion gear 16 and the geared portion 14 of the metal rim 13.

The housing 11, as can best be seen in FIG. 1, completely encompasses the matrix 10 and comprises a pair of end walls 18A and 18B. A substantially semi-circular partition plate 19 is secured to the housing 11 in a position intermediate the wall 18A and one base portion 10A of the matrix 10. A recessed portion 20 is provided on the face of the partition plate which is closely adjacent the base portion 10A and has an edge 20A outlining a configuration substantially congruent to the periphery of the partition plate 19. The wall 18B is provided with a similar recessed portion 21 facing the other base portion 10B of the matrix 10 in substantial alignment with the recess 20. The recessed portion 21 has an edge 21A outlining a configuration substantially congruent to the figure produced by the edge 20A. Since this recess 21 is semi-circular in shape and the wall 18B is circular, room is left in the lower half of the wall 18B to provide another recessed portion 22 also substantially semi-circular in outline but having an area somewhat smaller than the recesses 20 and 21. Like the other recessed portions, recess 22 has an edge which is made up of a linear portion 22A and an arcuate portion 22B. The edges 20A, 21A and 22B are each inclined inwardly as can be seen in FIG. 1. A seal assembly 25 is formed to be secured to the inclined edges 20A, 21A and 22B by any convenient means such as welding 26.

Referring now to FIG. 4 for a more detailed understanding of the seal assembly 25, a sealing strip 27 substantially T-shaped in cross-section is preferably constructed of a cast metal material and pre-formed to outline each of the recessed portions 20, 21 and 22. The strip 27 is provided with a face portion 32, coated with suitable wear material 33, and a leg portion 34 provided with a longitudinal slot 28. A spring strip 29, preferably constructed of stainless steel or the like, has a base portion 30 inclined so as to be complementary to the inclined edges 20A, 21A and 22B and a return bent portion 31 which frictionally engages the sides of the slot 28. An arcuate portion 32 provides the necessary resiliency for the seal assembly 25.

The base portion 30 is preferably welded in the inclined edges 20A, 21A and 22B as at 26. The sealing strips 27 are then snapped over the bent portion 31. The spring strip 29 urges the face portion 32 against the base portions 10A and 10B of the matrix 10, thus effectuating the necessary sealing action while at the same time providing the necessary flexibility to cushion the seal from the effects of housing warpage, core deflection and other local forces generated by the heat of the exhaust gases. The general outline of the seal assemblies 25 can best be seen in FIGS. 2 and 3.

In operation, compressed air enters the regenerator at the air inlet 35, as indicated by the arrows in FIG. 1, passes into the air inlet chamber 36, through the rotating matrix 10, into the air outlet chamber 37 and out the air outlet 38. The air inlet chamber 36 encompasses the periphery of the matrix 10. This can be best seen in FIG. 3. Exhaust gases enter the regenerator through the exhaust inlet 39, pass into the exhaust inlet chamber 40, through the rotating matrix 10, into the exhaust outlet chamber 41 and out the exhaust outlet (not shown). This flow pattern is sometimes generally called a counterflow path.

The difficulties in provided an effective seal for such a regenerative type heat exchanger may be illustrated by examining the results of experiments conducted using the apparatus of the present invention and showing the pressure and heat differentials which must be considered in constructing a seal. The following are only intended as illustrations since it is apparent that temperatures and pressures will depend upon many factors such as size and operating stage. The pressure differential existing between the air inlet chamber 36 and the exhaust outlet chamber 41, was approximately 40 p.s.i. to atmospheric pressure. The temperature differential was approximately 360° F. to 570° F. The pressure differential between the exhaust inlet chamber 40 and the air outlet chamber 37 was approximately 1 p.s.i. to 30 p.s.i. The temperature differential was 1200° F. to 940° F.

It will be apparent to one skilled in the art that the present invention provides a seal with a number of important advantages. These include a substantially symmetrical design, the effect being that warpage of the seal itself is substantially minimized. Also construction and assembly have been simplified through the utilization of only two parts. Warpage and other failures caused by welding and other fabrication processes have been overcome by the unique method by which the two parts are attached. This method of attachment provides easy assembly as well as ease in removal of the sealing strip for inspection and repair. It will be further apparent to those skilled in the art that while only one preferred form of the present invention has been illustrated and described, various changes and modifications in structure and design may be made without departing from the spirit of the invention or from the scope of the appended claims.

I claim:

1. In a rotary regenerative heat exchange apparatus having a housing and a matrix rotatably carried in said housing, a sealing means disposed between said housing and said matrix, said sealing means comprising
   (a) a sealing strip provided with a face portion and leg portion,
   (b) a longitudinal slot being provided in said leg portion of said sealing strip,
   (c) a resilient spring strip comprising a base portion secured to said housing, a medial arcuate portion integral with said base portion and an end portion integral with said medial portion,
   (d) said end portion being return bent to provide a pair of spaced substantially parallel resilient strips,
   (e) said spaced strips being received by said slot and resiliently engaging the sides thereof whereby said sealing strip is removably secured to said spring strip and said face portion is resiliently urged thereby into yielding contact with said matrix.

2. In a regenerative heat exchange apparatus
   (a) a cylindrical matrix of heat absorbent material having a pair of spaced substantially circular base portions,
   (b) a housing encompassing said matrix and means rotatably carrying said matrix in said housing,
   (c) said housing having inner walls closely adjacent and in substantial alignment with said base portions, and
   (d) sealing means secured to the periphery of said walls intermediate said walls and said base portions,
   (e) said sealing means comprising a sealing strip being substantially T-shaped in cross section to form a face portion and a reduced section leg portion, said leg portion having a longitudinal slot,
   (f) said sealing means further comprising a resilient spring strip having a base portion substantially parallel to and secured to said inner walls, and an end portion extending angularly outwardly from said base portion,
   (g) said end portion being return bent to provide a pair of spaced substantially resilient strips, and
   (h) said spaced strips being received by said slot and resiliently engaging the sides thereof whereby said sealing strip is removably secured to said spring strip and said face portion is resiliently urged thereby into yielding contact with said base portions of said matrix.

3. The apparatus as defined in claim 2 and in which said spring strip further comprises an arcuate medial portion intermediate said base portion and said end portion.

4. In a regenerative heat exchange apparatus,
   (a) a housing,
   (b) a matrix of heat absorbent material rotatably carried in said housing,
   (c) means rotating said matrix,
   (d) said housing comprising a pair of substantially circular walls disposed substantially normal to the axis of said matrix,
   (e) one of said walls being provided with a pair of substantially semi-circular recessed portions,
   (f) said recessed portions having arcuate edges substantially concentric with and closely adjacent to the periphery of said circular wall,
   (g) the other of said walls having a substantially semi-circular plate portion extending closely adjacent to said matrix,
   (h) said plate portion being disposed in a plane substantially normal to the axis of said matrix and being provided with a substantially semi-circular recess portion concentric with and having an edge closely adjacent the periphery of said plate portion,
   (i) a first resilient spring strip and a second resilient spring strip each having a flat base portion and an end portion extending angularly outwardly from said base portion,
   (j) said base portion of said first resilient spring strip being formed to outline said semi-circular recesses of said first mentioned wall portion and having an edge secured to said arcuate edges thereof,
   (k) said base portion of said second resilient spring strip being formed to outline said semi-circular recess portion of said plate portion and having an edge secured to said edge of said semi-circular recess portion.
   (l) said end portions of said spring strips each being return bent to provide a pair of spaced substantially parallel resilient strip portions,
   (m) a first sealing strip and a second sealing strip each having a longitudinal slot respectively receiving said end portions of said spring strips with the strip portions thereof engaging the sides of said slots, and
   (n) said sealing strips each having a face portion urged into yielding engagement by said spring strips with said base portions of said matrix.

5. The apparatus as defined in claim 4 and in which the face portions of each of said sealing strips is coated with a wear resistant material.

6. The apparatus as defined in claim 4 and in which each of said sealing strips is constructed of a cast metal material with said face portion being coated with a wear resistant material.

References Cited by the Examiner

UNITED STATES PATENTS 2,844,426  7/58  Glaser _____ 277—235
3,057,604 10/62  Bubniak et al. _____ 165—9
3,116,785  1/64  Bubniak _____ 165—9

FOREIGN PATENTS 649,265   1/51   Great Britain.
763,385  12/56   Great Britain.
175,628   6/61   Sweden.
268,287   9/50   Switzerland.

CHARLES SUKALO, *Primary Examiner.*